US012571426B2

(12) United States Patent
Wallace

(10) Patent No.: US 12,571,426 B2
(45) Date of Patent: Mar. 10, 2026

(54) MAGNETIC BEARING STATOR WITH IMPROVED BOBBINS

(71) Applicant: SKF CANADA LIMITED, Scarborough (CA)

(72) Inventor: Brett Wallace, Calgary (CA)

(73) Assignee: SKF CANADA LIMITED, Scarborough (CA)

( * ) Notice: Subject to any disclaimer, the term of this patent is extended or adjusted under 35 U.S.C. 154(b) by 238 days.

(21) Appl. No.: 18/361,039

(22) Filed: Jul. 28, 2023

(65) Prior Publication Data

US 2025/0035155 A1 Jan. 30, 2025

(51) Int. Cl.
*F16C 32/04* (2006.01)

(52) U.S. Cl.
CPC ........ *F16C 32/0461* (2013.01); *F16C 32/047* (2013.01)

(58) Field of Classification Search
CPC ............. H02K 2203/12; F16C 32/0461; F16C 32/047; F16C 32/048
USPC .............................................. 310/49.13, 194
See application file for complete search history.

(56) References Cited

U.S. PATENT DOCUMENTS

2018/0306239 A1* 10/2018 Zhang .................... F16C 32/044
2023/0037924 A1* 2/2023 Jung ...................... H02K 3/522

* cited by examiner

*Primary Examiner* — Christopher M Koehler
*Assistant Examiner* — Viswanathan Subramanian
(74) *Attorney, Agent, or Firm* — J-TEK LAW PLLC; Scott T. Wakeman; Mark A. Ussai

(57) ABSTRACT

A stator assembly for a magnetic bearing includes a core member formed of a ferromagnetic material and including an outer annular portion and a plurality of projections extending radially inwardly from the outer annular portion and spaced circumferentially about a centerline. A plurality of bobbins are formed of an electrically insulative material and include a first shell half disposed against a first axial end of a separate one of the projections and a second shell half disposed against a second axial end of the projection. The second shell half is coupled with the first shell half such that the one projection is enclosed within a cavity defined between the two shell halves. A plurality of windings each include at least one wire wound about a bobbin and electrically coupleable with a source of electric power such that each winding and the projection encircled by the winding provide a magnetic pole.

18 Claims, 15 Drawing Sheets

MAGNETIC BEARING STATOR WITH IMPROVED BOBBINS

BACKGROUND OF THE INVENTION

The present invention relates to magnetic bearings, and more particularly to stator assemblies for magnetic bearings.

Magnetic bearings are known and typically include a rotor which is levitated within an outer stator and rotated about a central axis. In active bearings, magnetic poles are generated within a core member of the stator by passing electric current through a plurality of windings. These windings are each generally wound about a bobbin which electrically insulates the coils of the winding from an inner core projection. Such bobbins are typically formed as a tubular member with cavity that is installed on a core member projections by sliding the bobbin radially outwardly onto the projection.

SUMMARY OF THE INVENTION

In one aspect, the present invention is a stator assembly for a magnetic bearing, the stator assembly comprising a core member formed of a ferromagnetic material, having a centerline and including an outer annular portion and a plurality of projections. The plurality of projections extend radially inwardly from the outer annular portion and spaced circumferentially about the centerline, each projection having a first axial end and an opposing second axial end. A plurality of bobbins are each formed of an electrically insulative material and includes a first shell half disposed against the first axial end of a separate one of the plurality of projections and a second shell half disposed against the second axial end of the one projection. The second shell half is coupled with the first shell half such that the one projection is enclosed within a cavity defined between the first and second shell halves. Further, a plurality of windings each include at least one wire wound about a separate one of the plurality of bobbins, each winding being electrically couple-able with a source of electric power such that each winding and the projection encircled by the winding provide a pole of the stator.

In another aspect, the present invention is again a stator assembly as described in the preceding paragraph, but in which each bobbin is provided as a pair of bobbins. Each pair of bobbins includes a pair of first shell halves connected by a first skirt portion, each one of the first shell halves being disposed against the first axial end of a separate one of two of the plurality of projections, and a pair of second shell halves connected by a second skirt portion, each one of the second shell halves being disposed against the second axial end of a separate one of the two projections. One of the second shell halves is coupled with the one of the two first shell halves disposed against the same one of the two projections to enclose the projection within a cavity defined between the first and second shell halves. The other one of second shell halves is coupled with the one of the two first shell halves disposed against the same one of the two projections to enclose the projection within a cavity defined between the first and second shell halves. With this structure, the winding disposed about one bobbin of each pair of bobbins and the projection encircled by the winding provides a north pole of the stator and the winding disposed about the other bobbin of each pair of bobbins and the projection encircled by the winding provides a south pole of the stator.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are drawn to scale, embodiments that are presently preferred. It should be understood, however, that the present invention is not limited to the precise arrangements and instrumentalities shown. In the drawings.

DETAILED DESCRIPTION OF THE INVENTION

Figure 1:
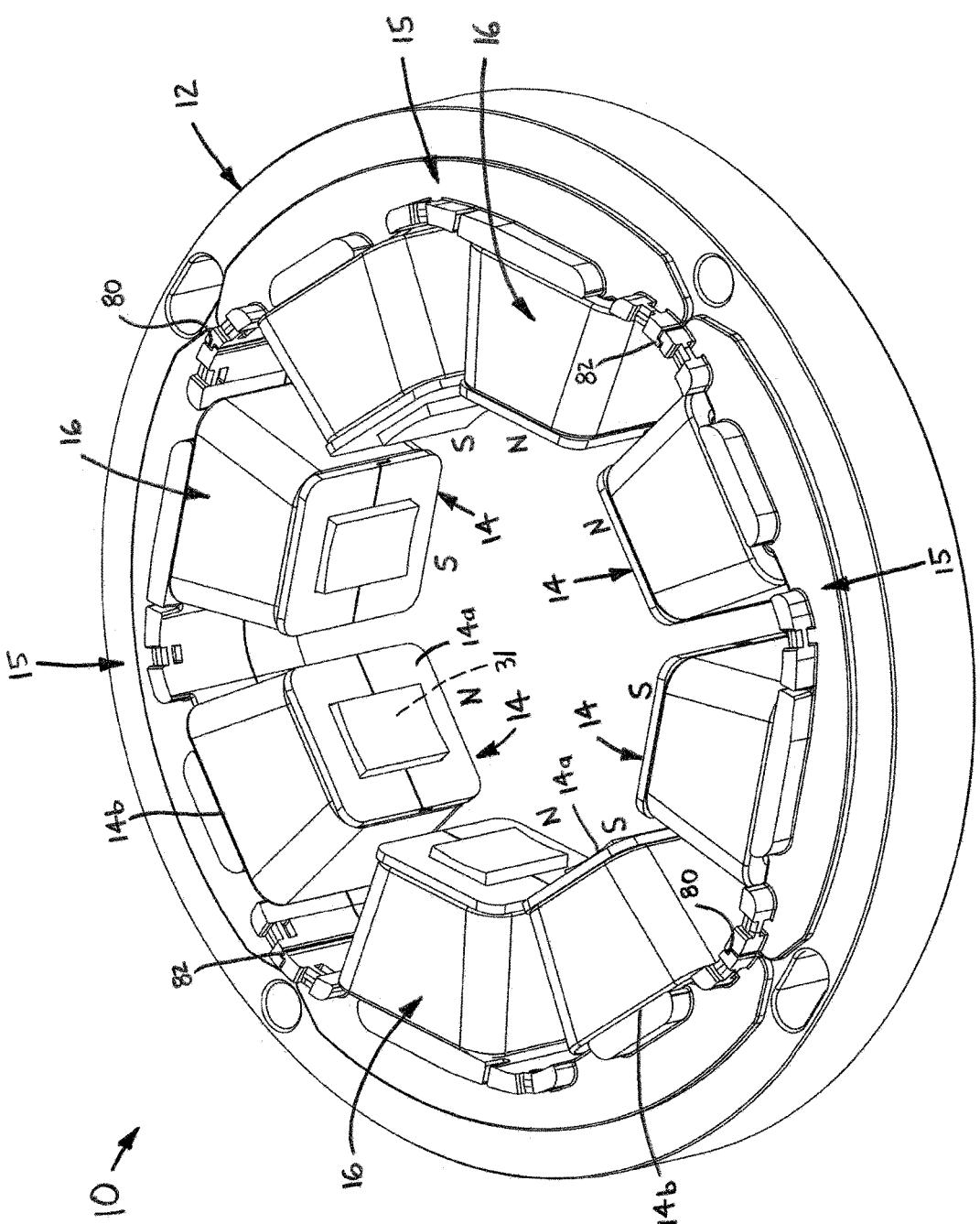
FIG. 1 is a perspective view of a stator assembly in accordance with the present invention.

Certain terminology is used in the following description for convenience only and is not limiting. The words "right", left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-15 a stator assembly 10 for a magnetic bearing which includes a housing containing the stator assembly 10, a rotor rotatably disposed within the stator and a source of electric power (only stator shown). The stator assembly 10 basically comprises a core member 12 formed of a ferromagnetic material, a plurality of bobbins 14 formed of an electrically insulative material and a plurality of windings 16 each disposed about a separate one of the bobbins 14 so as to provide a plurality of north poles N and a plurality of south poles S (FIG. 1).

Referring first to FIGS. 1-4, the core member 12 has a centerline L$_C$ (FIG. 2) and includes an outer annular portion 22 and a plurality of projections 24 extending radially inwardly from the outer annular portion and spaced circumferentially about the centerline L$_C$. The outer annular portion 22 has opposing first and second axial ends 22*a*, 22*b*, a plurality of inner circumferential surface sections 23A extending between each pair of adjacent projections 24 and an outer circumferential surface 23B. Further, each projection 24 has a first axial end 24*a*, an opposing second axial end 24*b*, a free, inner radial end 25*a* and an outer radial end 25*b* integrally formed with the annular portion 22. Preferably, each projection 24 has generally rectangular cross-sections and has opposing first and second circumferential sides 24*c*, 24*d* extending axially between the first and second axial ends 24*a*, 24*b*. Most preferably, the two circumferential sides 24*c*, 24*d* converge toward each other in a direction from the outer radial end 25*a* toward the inner radial end 25*b* such that each projection 24 is generally wedge-shaped. Furthermore, the core member 12 is preferably formed of a single stamping or by laser-cutting thin silica-steel sheets which are bonded together to form the complete core member 12.

Figure 2:
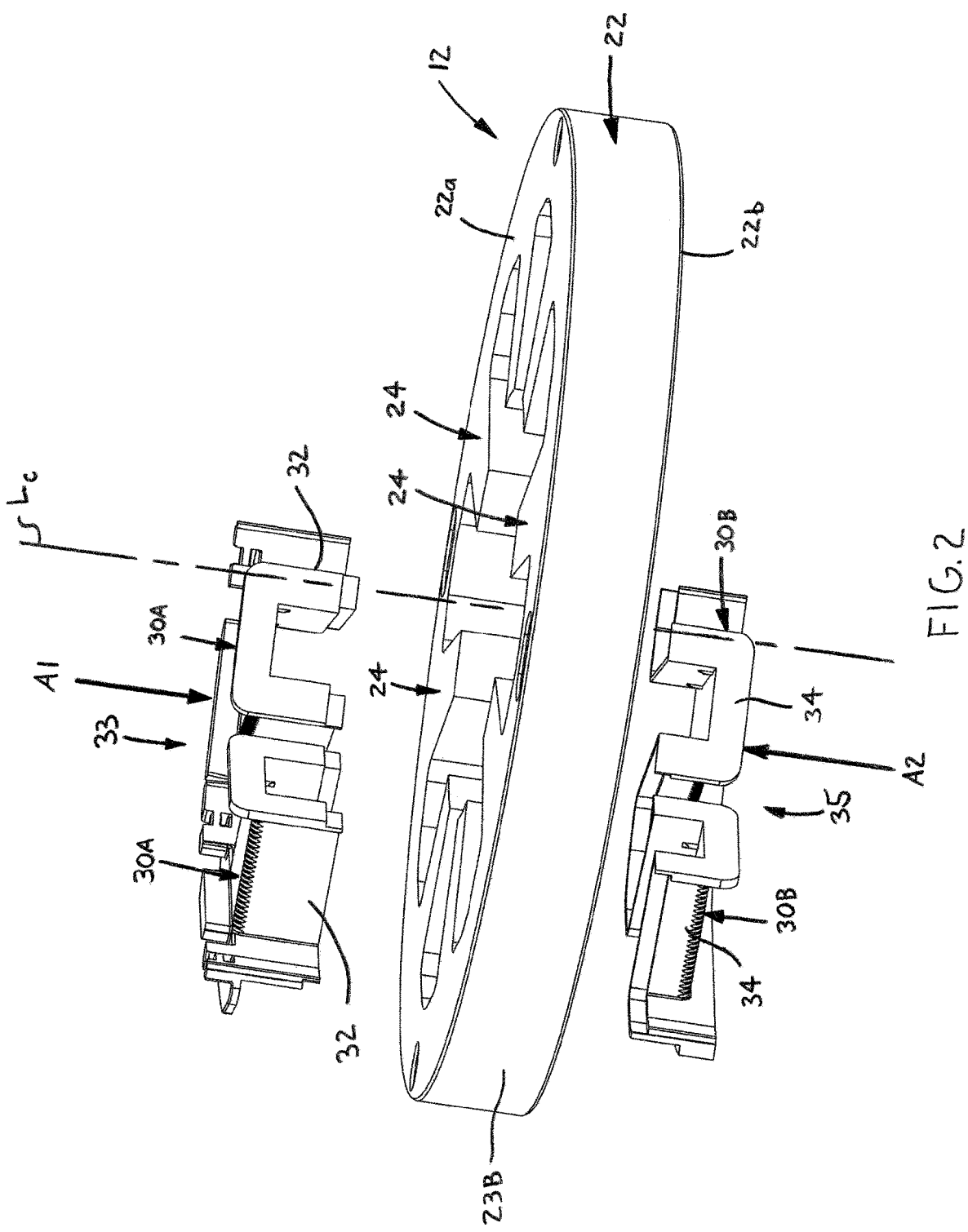
FIG. 2 is a perspective view of the process of assembling one preferred pair of bobbins onto a core member.
Figure 3:
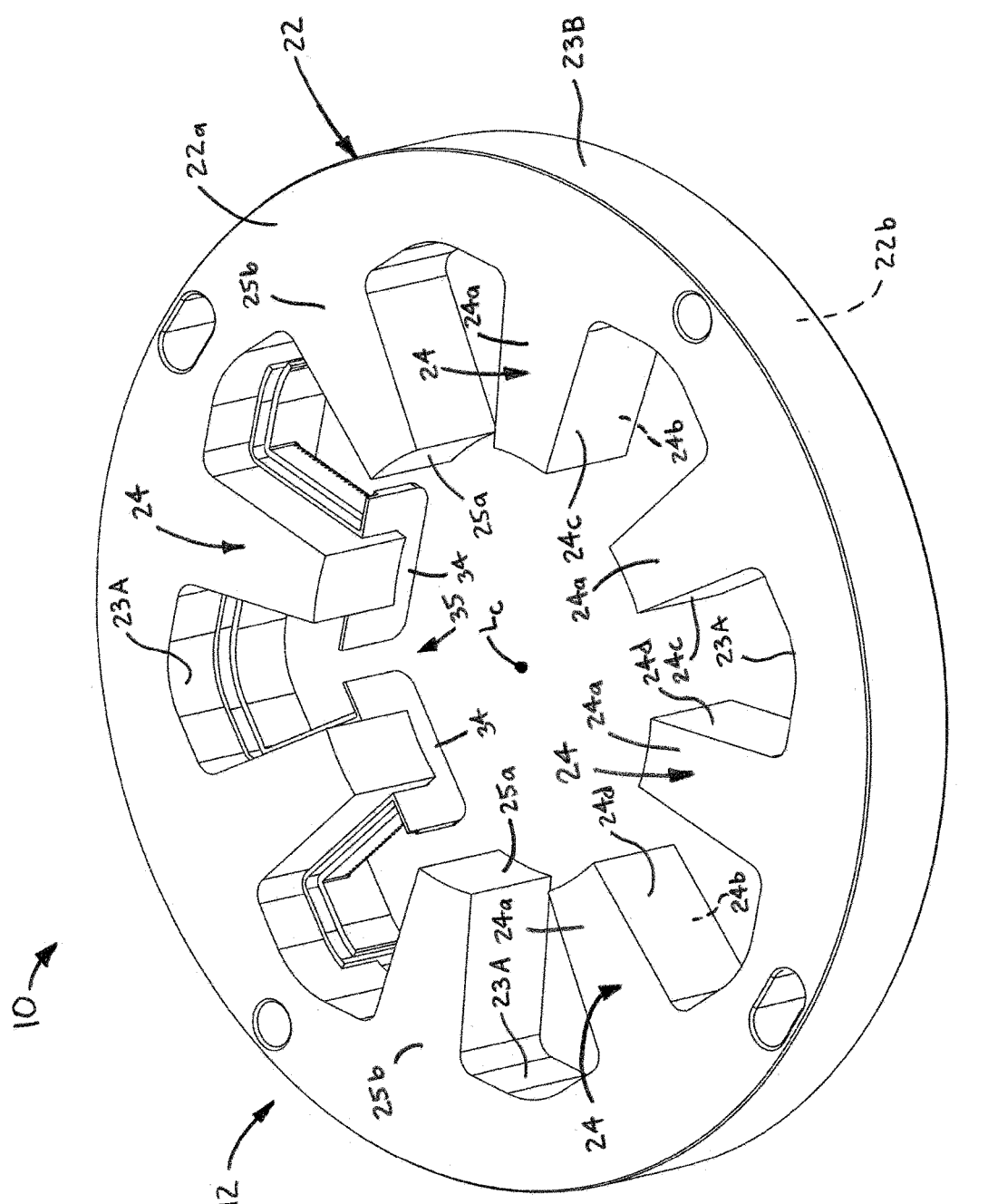
FIG. 3 is a perspective view of the core member with one pair of second housing halves installed.
Figure 4:
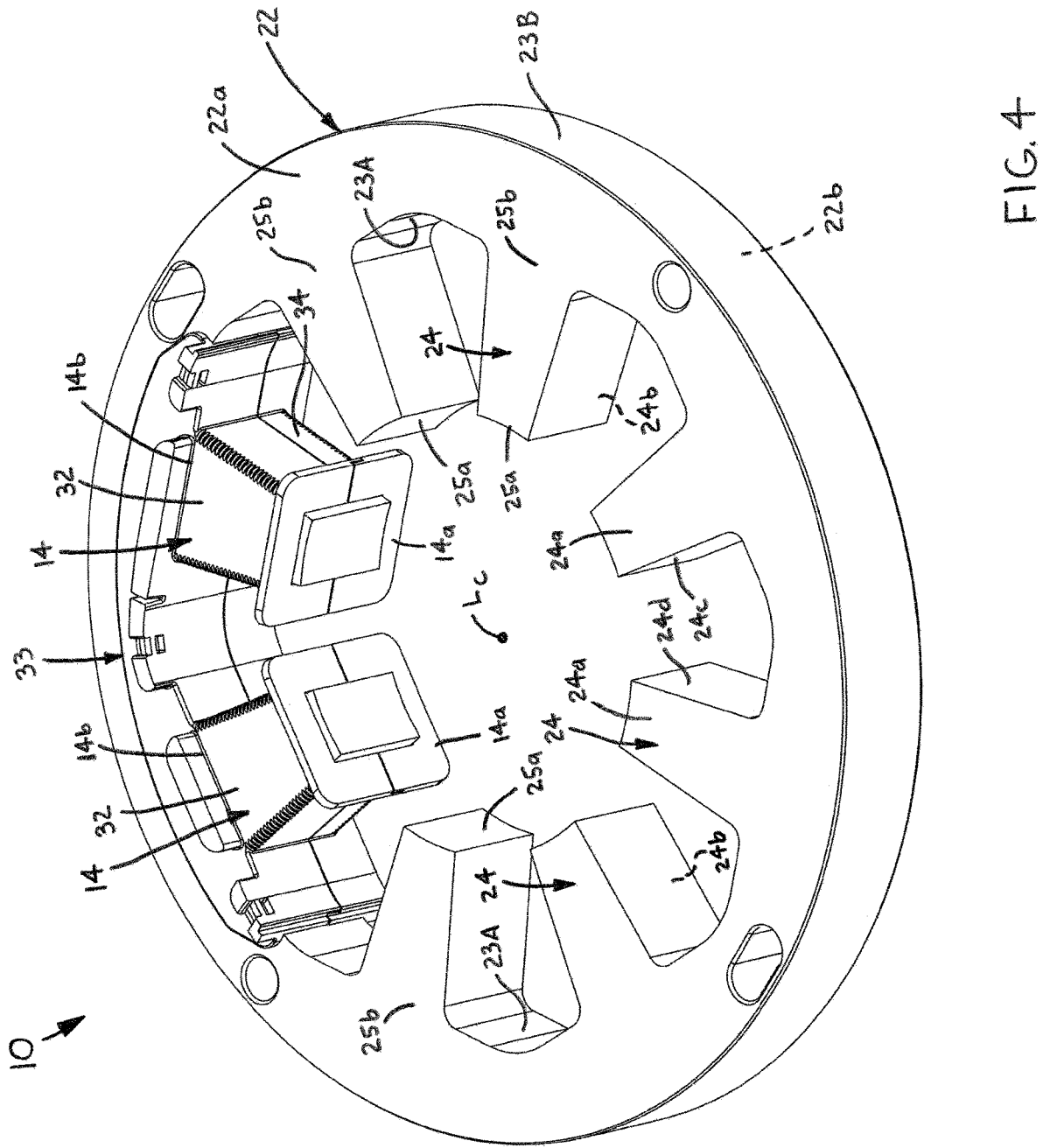
FIG. 4 is a perspective view of the core member with one pair of the bobbins installed.
Figure 5:
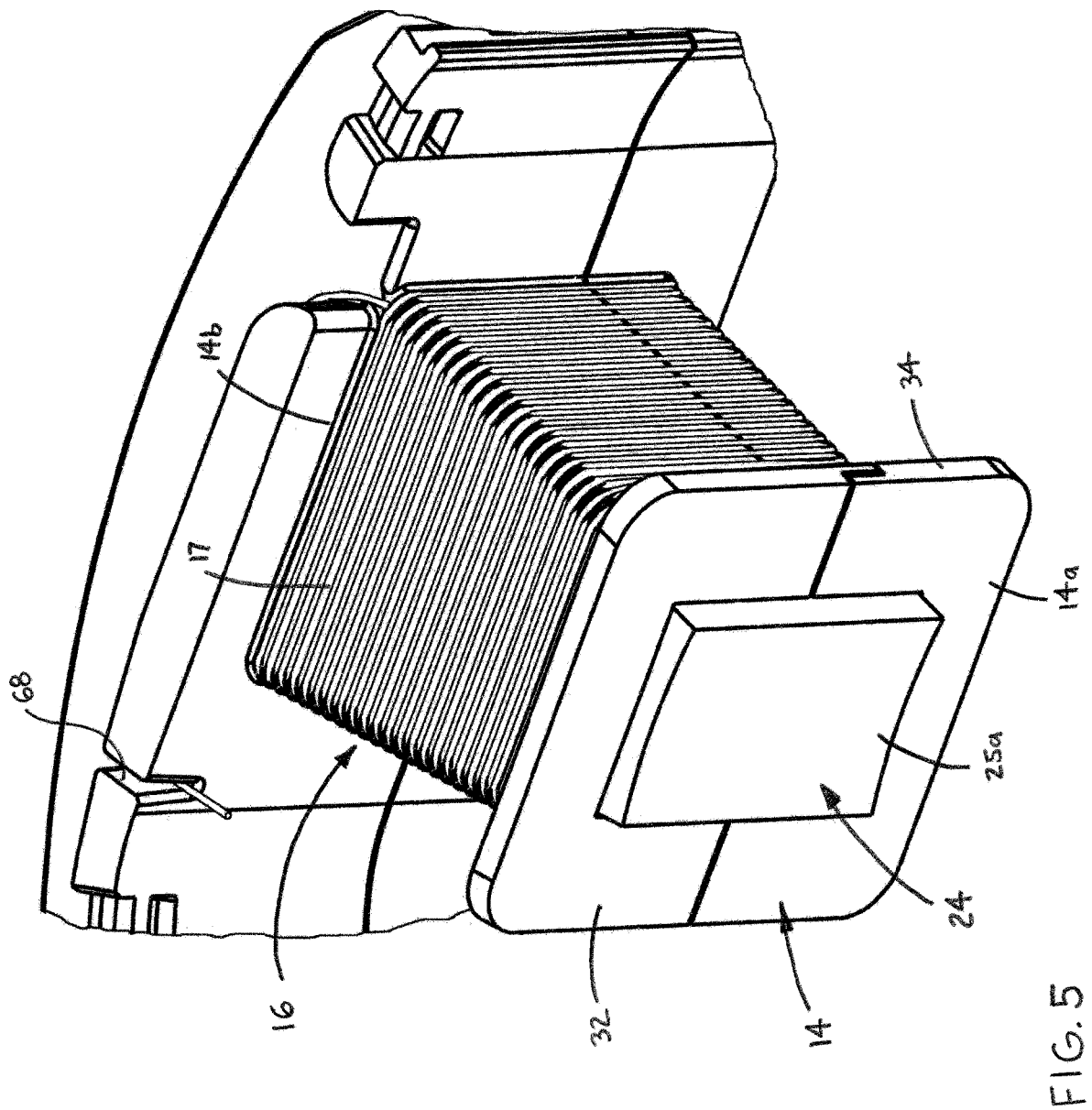
FIG. 5 is a broken-away top, front perspective view of one winding of the stator assembly.

Referring now to FIGS. 1, 2 and 5, each bobbin 14 is disposed about a separate one of the plurality of core member projections 24 and has an inner radial end 14*a* adjacent to inner radial end 25*a* of the enclosed projection 24 and an outer radial end 14*b* adjacent to the outer radial end 24*b* of the enclosed projection 24. The bobbins 14 are each formed of two parts or segments 30A, 30B, preferably two shell halves 32, 34, which are assembled together axially about a separate one of the projections 24 as described in detail below. More specifically, each bobbin 14 includes a first segment 30A or first shell half 32 disposed against the first axial end 24*a* of a separate one of the plurality of projections 24 and a second segment 30A or second shell half 34 disposed against the second axial end 24*b* of the one projection 24. The second segment 30B/shell half 34 is coupled with the first segment 30A/first shell half 32 such that the one projection 24 is enclosed within a cavity 31 defined between the first and second shell halves 32, 34. Most preferably, each first shell half 32 is provided as a pair 33 of first shell halves 32 and each second shell half 34 is provided as a pair 35 of second shell halves 34, such that each engaged pair 33, 35 of the shell halves 32, 34 provide two bobbins 14, as described in detail below. Furthermore, each bobbin 14 is preferably formed of a polymeric material, such as for example, nylon, polyetherimide (PEI), acrylonitrile butadiene styrene (ABS), polyether ether ketone (PEEK), etc.

Referring to FIGS. 1 and 5, the plurality of windings 16 each include at least one wire 17 wound about a separate one of the plurality of bobbins 14 so as to extend circumferentially about the bobbin 14 and radially between the bobbin inner end 14*a* and the bobbin outer end 14*b*. Preferably, the wire winding is performed by an automated process, most preferably needle winding, but may alternatively be manually wound. In any case, each winding 16 is electrically coupleable with a source of electric power (not depicted) such that each winding 16 and the projection 24 encircled by the winding 16 provide a pole N or S of the stator assembly 10, while each bobbin 14 prevents electric flow between the winding 16 and the enclosed projection 24. Preferably, each winding 16 is configured and electrically connected with an adjacent winding 16 such that one winding 16 generates a north pole N while the adjacent, connected winding 16 generates a south pole S and magnetic flux passes in a circuit between the poles N, S and depicted in FIG. 1. Thus, with the preferred pairs 33, 35 of shell halves 32, 34, each pair 15 of the bobbins 14 formed thereby are configured to provide mounting surfaces for both the windings 16 and the connecting wires for one pair of complementary north and south poles N, S, while electrically insulating the two windings 16 from the encircled projections 24. In a presently preferred embodiment, the pairs 15 of bobbins 14 and the windings 16 are arranged and configured (e.g., electrically connected) to provide an arrangement of north poles N and south poles S in a pattern of N-S-S-N-N-S-S-N moving clockwise about the stator assembly 10, as indicated in FIG. 1.

By forming the bobbins 14 of two-piece construction as described above and in further detail below, the installation of the bobbins 14 onto the projections 24 of the core member 12 is greatly facilitated, and more readily automated, due to the two bobbin segments 30A, 30B being displaced axially into engagement with a projection 24 from opposing axial directions. Thus, all of the bobbin segments 30A or 30B may be installed simultaneously onto all of the projections 24 by a single axial movement. In contrast, conventional one-piece bobbins must each be first positioned within a central opening of the core member 12 (i.e., defined between the inner ends 25*a* of the core projections 24) and then displaced radially outwardly to install the bobbin onto a core projection. As each core member projection is located at a different angular position about a centerline, each one-piece bobbin must be displaced radially in an angular direction that differs from the radial displacement direction of all other bobbins installed on the same core member, thus complicating automation of the bobbin installation process. Having described the basic structure and functions above, these and other elements of the stator assembly 10 of the present invention are described in greater detail below.

Referring now to FIGS. 6, 7, 9-12, 14 and 15, the first shell half 32 of each one of the plurality of bobbins 14 has an inner radial end 32*a*, an outer radial end 32*b*, an outer surface 36A, an inner surface 36B defining an elongated channel 37 extending radially between the inner and outer ends 32*a*, 32*b*. As such, each first shell half 32 is installed on a separate one of the core member projections 24 by relative axial displacement between the first shell half 32 and the one projection 24 in a first axial direction A1 (FIG. 2) so that at least a portion of the one projection 24 becomes disposed within the elongated channel 37 of the first shell half 32. Similarly, each second shell half 34 has an inner radial end 34*a*, an outer radial end 34*b*, an outer surface 38A and an inner surface 38B bounding an elongated channel 39 extending radially between the inner and outer ends 34*a*, 34*b*. With this structure, each second shell half 34 is installed on a separate one of the core member projections 24 by relative axial displacement between the second shell half 34 and the one projection 24 in a second, opposing axial direction A2 (FIG. 2). Thereby, at least a portion of the one projection 24 becomes disposed within the elongated channel 39 of the second shell half 34. Thus, when the shell halves 32, 34 are connected together, each projection 24 is enclosed or encased within the facing channels 37, 39 of the two shell halves 32, 34.

Referring to FIGS. 6-10, each first shell half 32 preferably includes a first sidewall 40 and a second sidewall 42 extending radially between the inner and outer radial ends 32*a*, 32*b* and parallel with each other. The two sidewalls 40, 42 define the elongated channel 37 and are connected by a central base wall 44 having opposing circumferential ends 44*a*, 44*b*. Specifically, the first sidewall 40 extends axially from the first circumferential end 44*a* of the base wall 44 and the second sidewall 42 extends axially from the second circumferential end 44*b* of the base wall 44. Each sidewall 40, 42 has first edge 40*a*, 42*a*, respectively, integral with a circumferential end 44*a*, 44*b*, respectively, of the end wall 44 and a free second edge 40*b*, 42*b* configured to engage with the second shell half 34 as described below.

In order to fit complementarily about a core member projection 24, the two sidewalls 40, 42 preferably converge toward each other in a direction from the outer radial end 32*b* toward the inner radial end 32*a* such that each shell half 32 is generally wedge-shaped. Also, the base wall 44 is preferably flat and is disposed against the first axial end 24*a* of a core member projection 24, such that the first shell half 32 has generally rectangular axial cross-sections. However, particularly if the core member projections 24 are curved, the base wall 44 may be similarly curved such that the first shell half 32 has generally U-shaped axial cross-sections (structure not shown). Further, when installed about a projection 24, the first sidewall 40 is disposed against the first circumferential end 24*c* of the enclosed projection 24 and the second sidewall 42 is disposed against the second circumferential end 24*d* of the enclosed projection 24.

Figure 8:
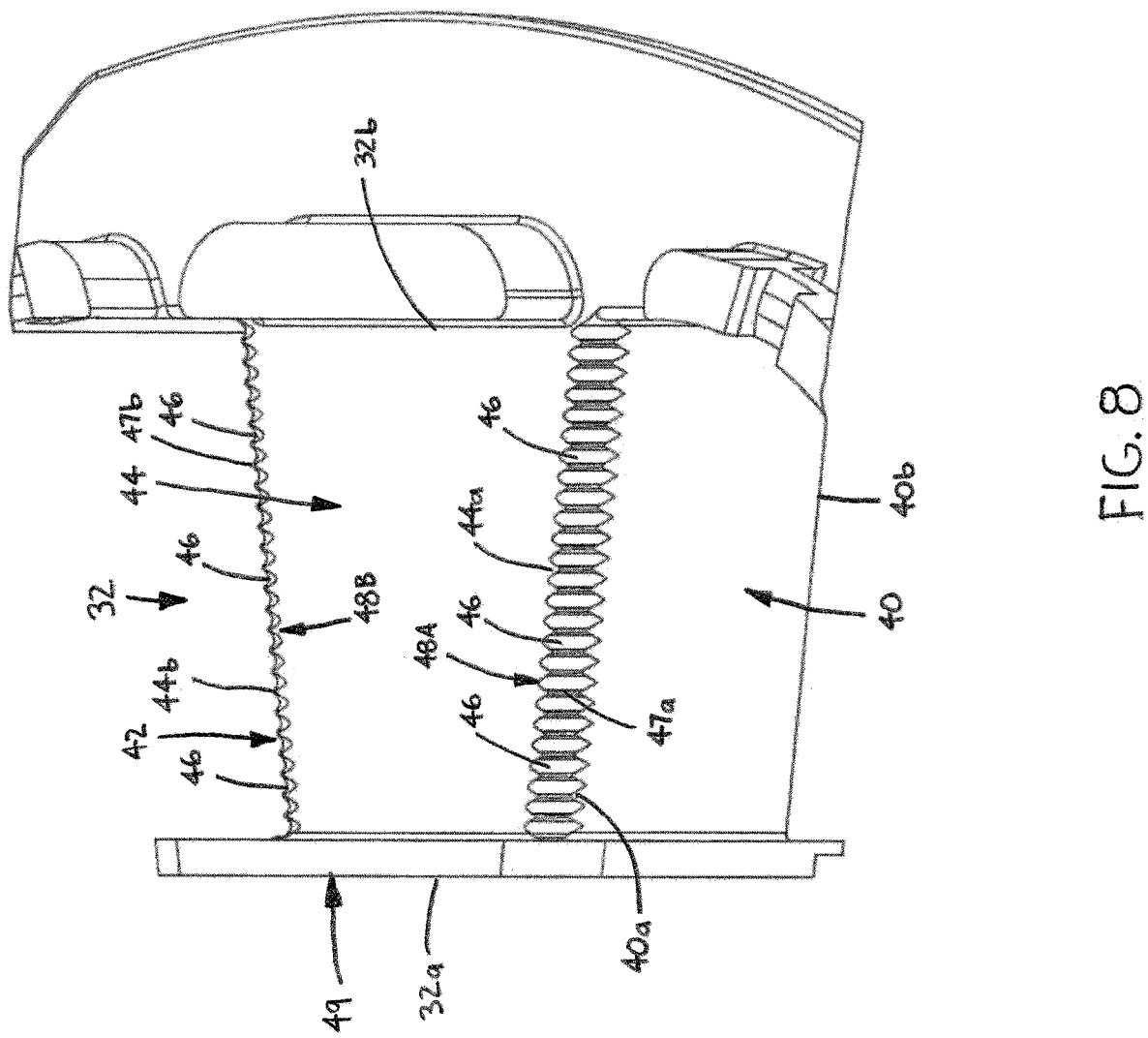
FIG. 8 is a broken-away, top and side perspective view of one first housing half.

As best shown in FIG. 8, each first shell half 32 preferably further includes a plurality of grooves 46 formed in the shell outer surface 36A and spaced radially apart between the inner and outer radial ends 32*a*, 32*b*. Each groove 46 is configured to receive a portion of the at least one wire 17 of the winding 16 disposed about the bobbin 14 formed by the particular shell half 32. As such, the grooves 46 both retain the wire 17 during the process of winding the wire 17 about the bobbin 14 as well as maintaining separation between adjacent coils of the winding 16. Most preferably, the grooves 46 include a first set of grooves 48A formed along a first corner 47*a* between the base wall 44 and the first sidewall 40 and a second set of grooves 48B formed along a second corner 47*b* between the base wall 44 and the second sidewall 42. The two sets of grooves 48A, 48B are preferably staggered in the radial direction to facilitate winding the wire 17 about the bobbin 14 formed by the first shell half 32. Furthermore, each first shell half 32 also preferably includes a retainer flange 49 extending axially and circumferentially from the inner radial end 32*a*, each flange portion 49 being configured to retain an inner radial end 16*a* of the winding 16 disposed about the one bobbin 14 formed by the particular first shell half 32. Specifically, each retainer flange 49 has a radial section 49*a* extending radially outwardly from the base wall 44 and two circumferential sections 49*b* extending outwardly from the two sidewalls 40, 42

Referring now to FIGS. 11-15, each second shell half 34 is constructed generally similarly to, and complementary with, each first shell half 32. Specifically, each second shell half 32 preferably includes a first sidewall 50 and a second sidewall 52 extending radially between the inner and outer radial ends 34*a*, 34*b* and parallel with each other. The two sidewalls 50, 52 define the elongated channel 39 and are connected by a central base wall 54 having opposing circumferential ends 54*a*, 54*b*. Specifically, the first sidewall 50 extends axially from the first circumferential end 54*a* of the base wall 54 and the second sidewall 52 extends axially from the second circumferential end 54*b* of the base wall 54. Each sidewall 50, 52 has first edge 50*a*, 52*a*, respectively, integral with a circumferential end 54*a*, 54*b*, respectively, of the base wall 54 and a free second edge 50*b*, 52*b* configured to engage with the second shell half 34 as described below.

In order to fit complementarily about a core member projection 24, the two sidewalls 50, 52 preferably converge toward each other in a direction from the outer radial end 34*b* toward the inner radial end 34*a* such that each shell half 34 is generally wedge-shaped. Also, the base wall 54 is preferably flat and is disposed against the second axial end 54*a* of a core member projection 24, such that the second shell half 32 has generally rectangular axial cross-sections, but the base wall 53 may alternatively be curved such that the second shell half 34 has U-shaped cross-sections as discussed above with the first shell halves 32. Further, when installed about a projection 24, the first sidewall 50 is disposed against the second circumferential end 24*c* of the enclosed projection 24 and the second sidewall 52 is disposed against the second circumferential end 24*d* of the enclosed projection 24.

Figure 13:
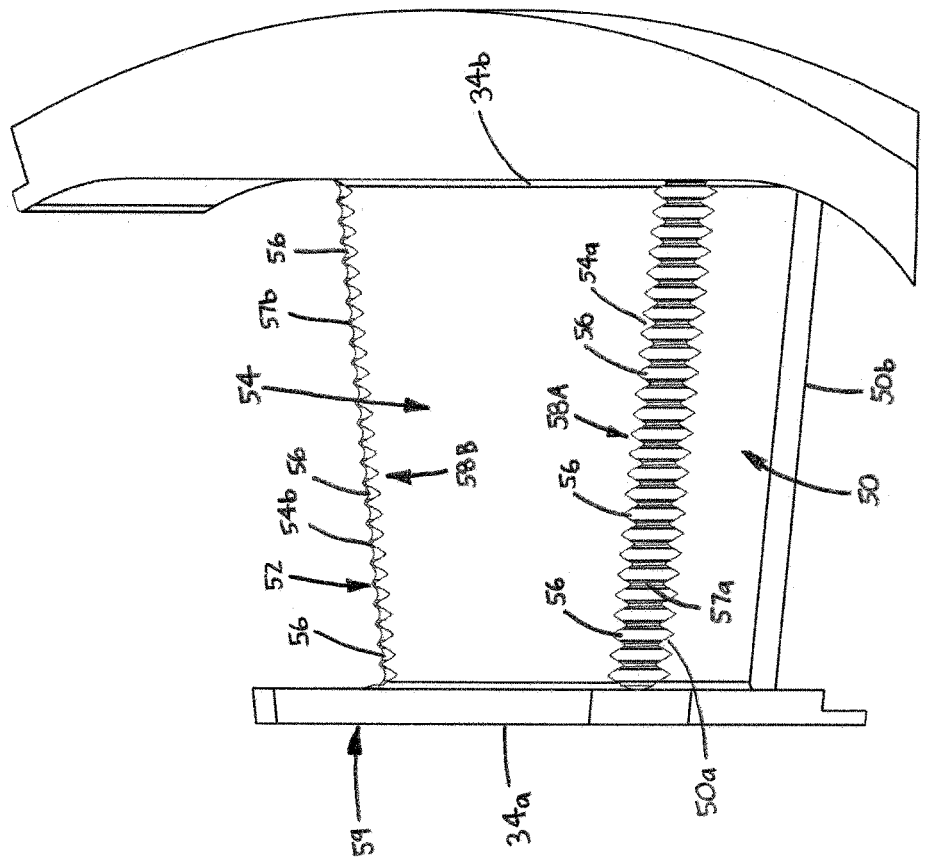
FIG. 13 is a broken-away, top and side perspective view of one second housing half.
Figure 14:
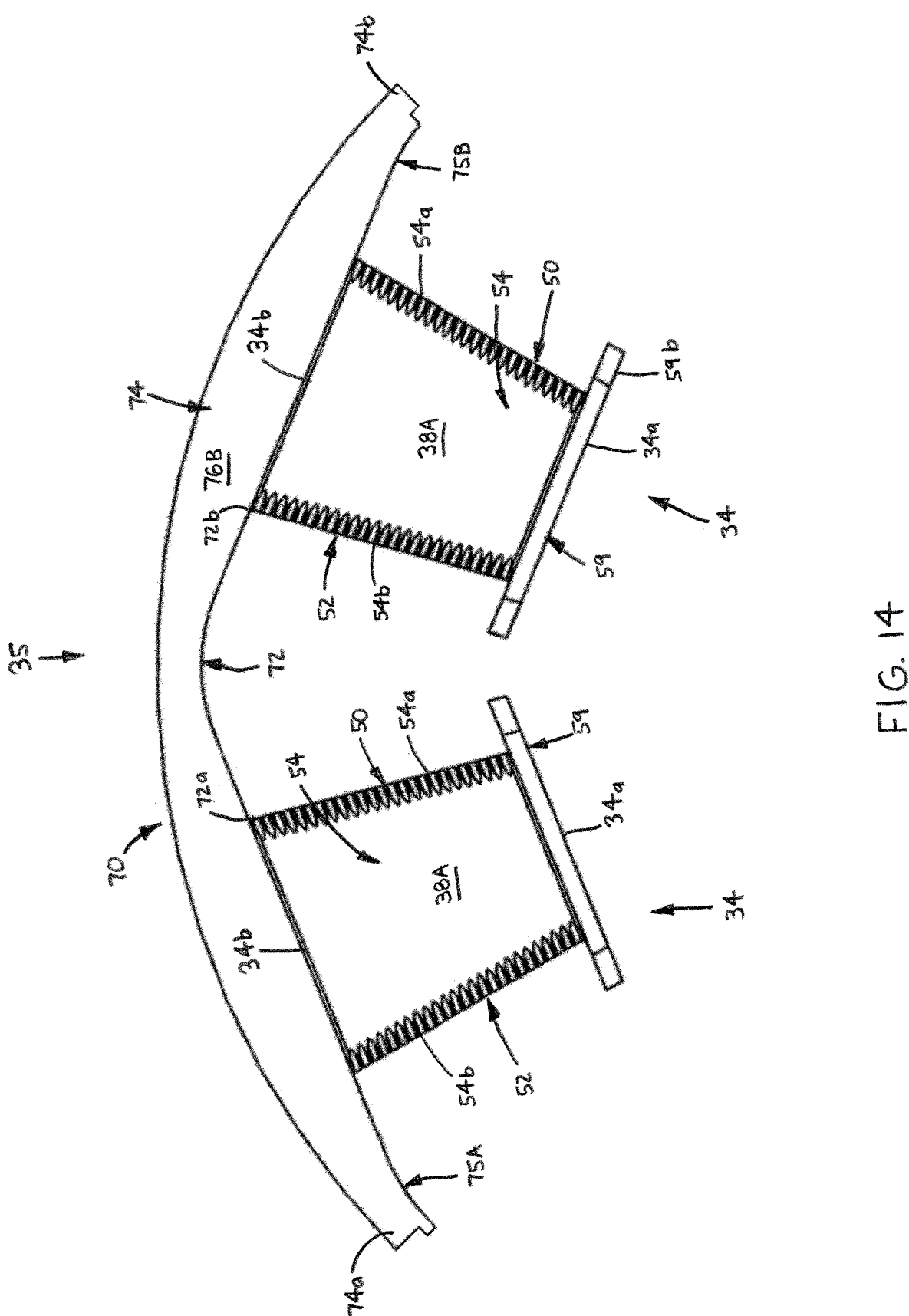
FIG. 14 is a top plan view of the pair of the second housing halves.
Figure 15:
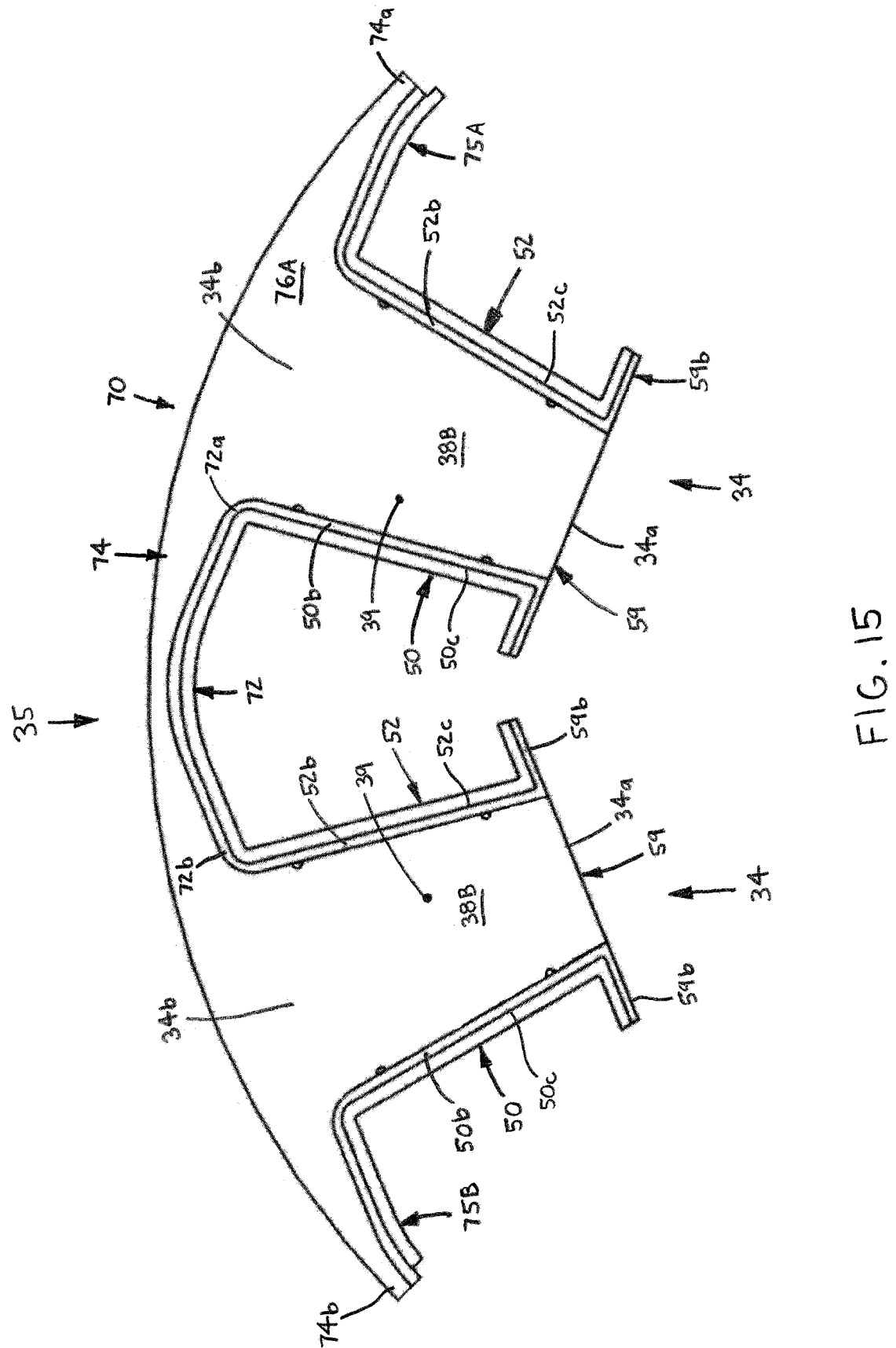
FIG. 15 is a bottom plan view of the pair of the second housing halves.

As best shown in FIG. 13, each second shell half 34 preferably further includes a plurality of grooves 56 formed in the shell outer surface 38A and spaced radially apart between the inner and outer radial ends 34*a*, 34*b*. Each groove 56 is configured to receive a portion of the at least one wire 17 of the winding 16 disposed about the bobbin 14 formed by the particular shell half 32 for the same reasons as discussed above with the grooves 46. Similar to the first shell halves 32, the grooves 56 of the second shell halves 34 preferably include a first set of grooves 58A formed along a first corner 57*a* between the base wall 54 and the first sidewall 50 and a second set of grooves 58B formed along a second corner 57*b* between the base wall 54 and the second sidewall 52, which are preferably staggered in the radial direction. Also, each second shell half 34 preferably further includes a retainer flange 59 extending axially and circumferentially from the shell half inner radial end 34*a* and configured to retain the inner radial end 16*a* of the associated winding 16. Specifically, each retainer flange 59 has a radial section 59*a* extending radially outwardly from the base wall 54 and two circumferential sections 59*b* extending outwardly from the two sidewalls 50, 52.

Referring to FIGS. 6, 7, 10, 12 and 15, with the above-described structures, the first sidewalls 40, 50 of each one of the first and second shell halves 30, 32 are each configured to engage with a snap fit and the second sidewalls 42, 52 of each one of the first and second shell halves 30, 32 are also each configured to engage with a snap fit. Preferably, the retainer flanges 49, 59 of the respective first and second shell halves 30, 32 are also configured to engage with a snap fit. More specifically, each sidewall 40, 42 of each first shell half 32 has an elongated stepped section 40*c*, 42*c* extending inwardly from the shell inner surface 36B adjacent to each wall outer edge 40*b*, 42*b* and each sidewall 50, 52 of each second shell half 34 has an elongated stepped section 50*c*, 52*c* adjacent to the wall outer edges 50*b*, 52*b* which extend inwardly from the shell inner surface 38B. The two stepped sections 40*c*, 42*c* of the sidewalls 40, 42 of each first shell half 32 are frictionally engaged with the respective stepped sections 50*c*, 52*c* of the sidewalls 50, 52 of each second shell half 34 to couple the two shell halves 32, 34 and thereby enclose one of the core member projections 24.

Further, the two circumferential sections 49*b* of the retainer flange 49 of each first shell half 32 each have a stepped section 49*d* extending inwardly from an inner radial surface 49*c* and the two circumferential sections 59*b* of the retainer flange 59 of each second shell half 34 each have a stepped section 59*d* extending inwardly from an outer radial surface 59*c*. The two flange stepped sections 49*d* of each first shell half 32 are frictionally engaged with the flange stepped sections 59*d* of the associated second shell half 34 to further strengthen the snap fit engagement of the first and second shell halves 32, 34. However, the shell halves 32, 34 of each bobbin 14 may be formed with any other structure to provide an interlocking snap fit or may be retained together by fasteners, adhesives or any other known manner as desired.

Referring now to FIGS. 1, 6, 7, 9-12, 14 and 15, as discussed above, each bobbin 14 is preferably provided as a pair 15 of bobbins 14 which are used to form a pair of north and south poles N, S. Specifically, the first shell half 32 of each one of the pairs 15 of bobbins 14 is provided as a pair 33 of first shell halves 32 connected by a radially-outer first skirt portion 60. Similarly, the second shell half 34 of each bobbin pair 15 is provided as a pair 35 of second shell halves 34 connected by a radially-outer second skirt portion 70. As with the shell halves 32, 34, the skirt portions 60, 70 function to electrically insulate the wires 17 of the windings 16 and the lead lines (none shown) as well as to provide mechanical stiffness to each bobbin 14.

Referring to FIGS. 6, 7, 9 and 10, the first skirt portion 60 of each pair 33 of the first shell haves 32 has a circumferential section 62 disposed against one inner circumferential surface section 23A of the core member annular portion 22 and a radial flange section 64 disposed against the first axial end 22*a* of the core member annular portion 22. Each circumferential section 62 has a first circumferential end 62*a* integrally formed the radial outer end of the first sidewall 40 of a "left" one of the first shell halves 32 and a second circumferential end 62*a* integrally formed with the outer radial end of the second sidewall 42 of a "right" one of the first shell halves 32. Preferably, the first skirt portion 60 further includes a first circumferential end section 65A extending circumferentially from the second sidewall 42 of the "left" shell half 32 and a second circumferential end section 65B extending circumferentially from the first sidewall 40 of the "right" shell half 32.

Further, each radial flange section 64 is integrally formed with the two base walls 44 of the connected shell halves 32 and with the circumferential section 62 of the first skirt portion 60. Preferably, each radial flange section 64 extends circumferentially outwardly beyond the outer walls 40, 42 of the connected shell halves 32 to provide a substantial mounting surface 63B for lead lines and wires 17. Specifically, the flange section 64 has opposing first and second circumferential ends 64*a*, 64*b*, an inner axial surface 63A disposed against the first axial end 22*a* of the core member annular portion 22 and an opposing outer axial surface 63B.

Figure 6:
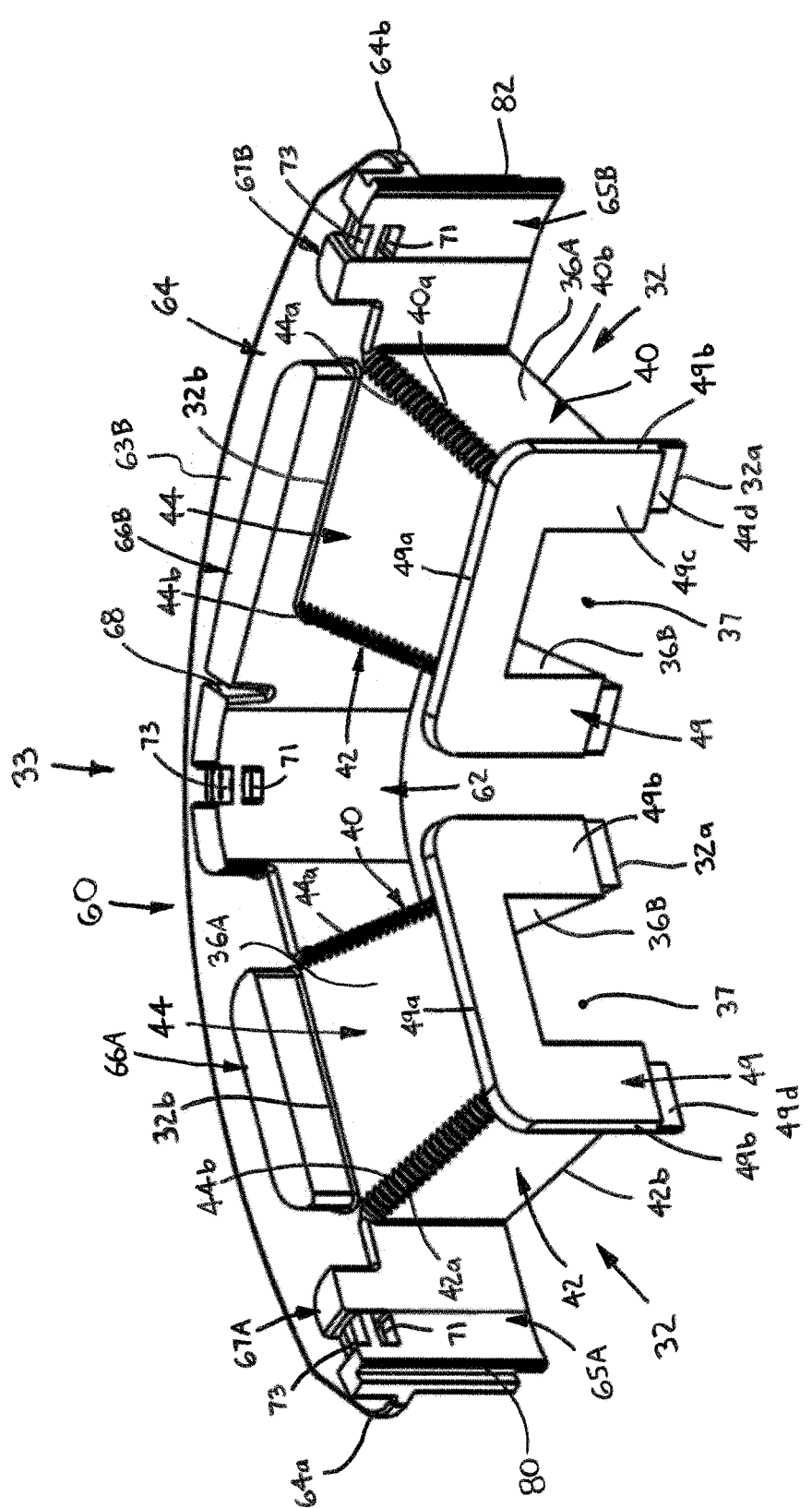
FIG. 6 is a top, inner perspective view of a preferred pair of the first housing halves.
Figure 7:
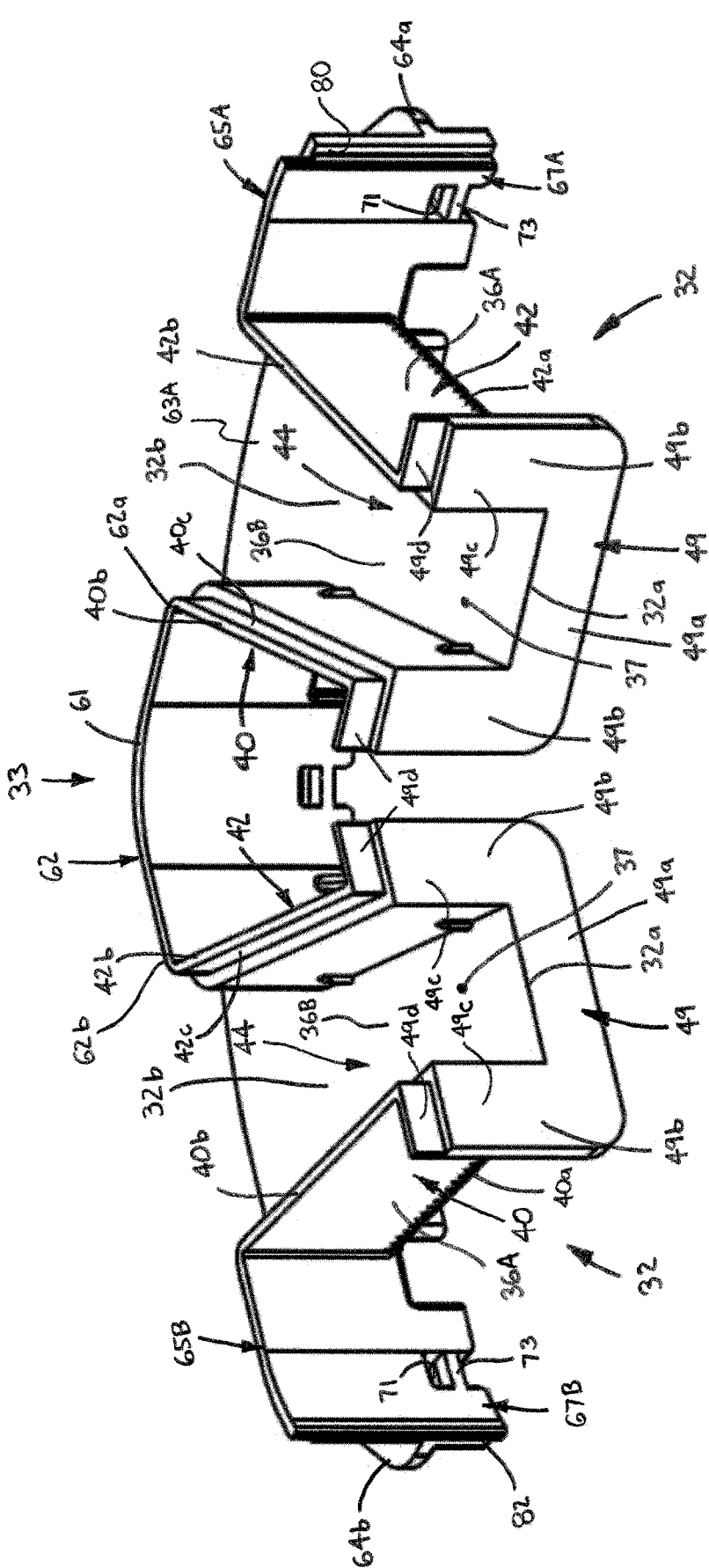
FIG. 7 is a bottom, inner perspective view of the pair of the first housing halves.
Figure 9:
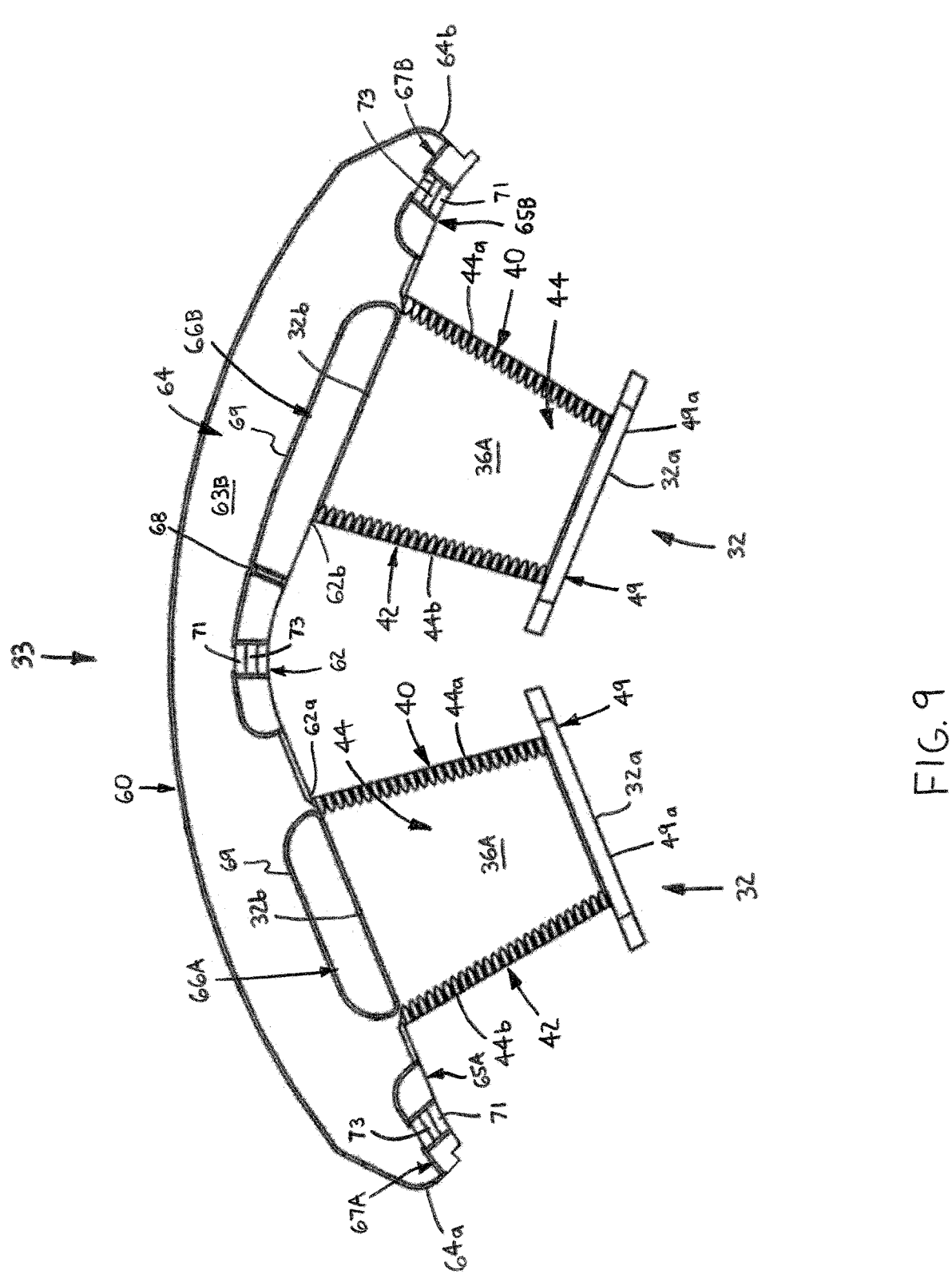
FIG. 9 is a top plan view of the pair of the first housing halves.
Figure 10:
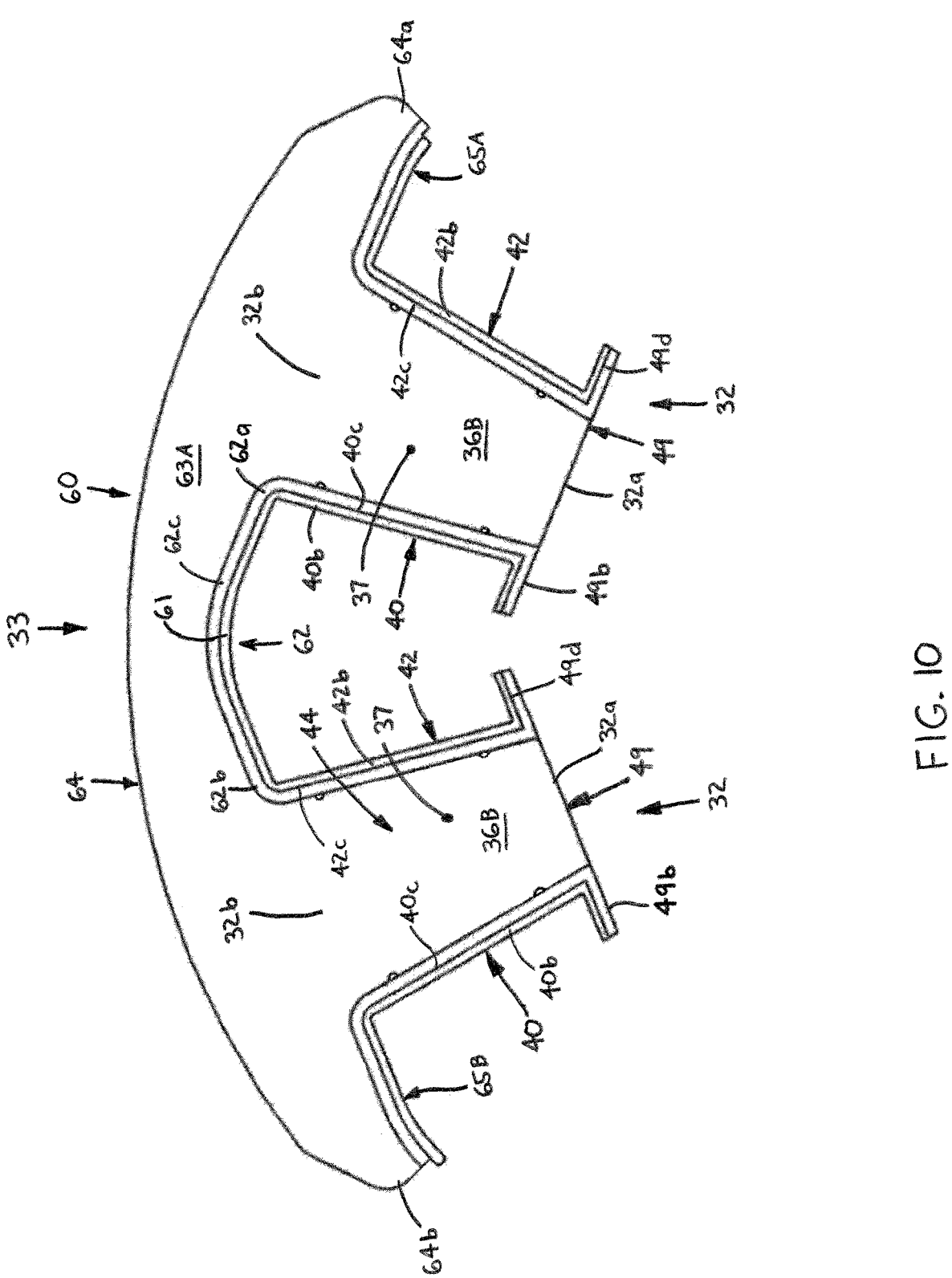
FIG. 10 is a bottom plan view of the pair of the first housing halves.

As shown in FIGS. 6 and 9, the radial flange section 64 of each first skirt portion 60 preferably includes two elongated, central shoulders 66A, 66B and two end shoulders 67A, 67B, each shoulder 66A, 66B, 67A and 67B extending axially outwardly and circumferentially from the flange section 64. Specifically, one elongated shoulder 66A is located adjacent to the outer radial end 32*b* of the "left" one of the first shell halves 32 and the other shoulder 66B is located adjacent to the outer radial end 32*b* of the "left" one of the first shell halves 32, each shoulder 66A, 66B having an outer surface 69 about which a wire 17 may be partially wrapped. The shoulder 66B has a retainer notch 68 configured to receive and retain in tension a portion of the at least one wire 17 extending radially outwardly from the winding 16 disposed on the adjacent bobbin 14, as shown in FIG. 5.

Furthermore, each end shoulder 67A, 67B is located adjacent to a separate circumferential end 64*a*, 64*b*, respectively, of the radial flange section 64. Each end shoulder 67A, 67B and the elongated shoulder 66B includes a clearance opening 69 and a tie bar 71 for fastening cable ties for a lead wire or a winding wire 17.

Referring now to FIGS. 11, 12, 14 and 15, the second skirt portion 70 of each pair 35 of the second shell halves 34 has a circumferential section 72 disposed against one inner circumferential surface section 23A of the core member annular portion 22 and a radial flange section 74 disposed against the second axial end 22*a* of the core member annular portion 22. Each circumferential section 72 has a first circumferential end 72*a* integrally formed the radial outer end of the first sidewall 50 of a "left" one of the second shell halves 34 and a second circumferential end 72*a* integrally formed with the outer radial end of the second sidewall 52 of a "right" one of the first shell halves 34. Preferably, the second skirt portion 70 further includes a first circumferential end section 75A extending circumferentially from the second sidewall 52 of the "left" shell half 34 and a second circumferential end section 75B extending circumferentially from the first sidewall 50 of the "right" shell half 34.

Figure 11:
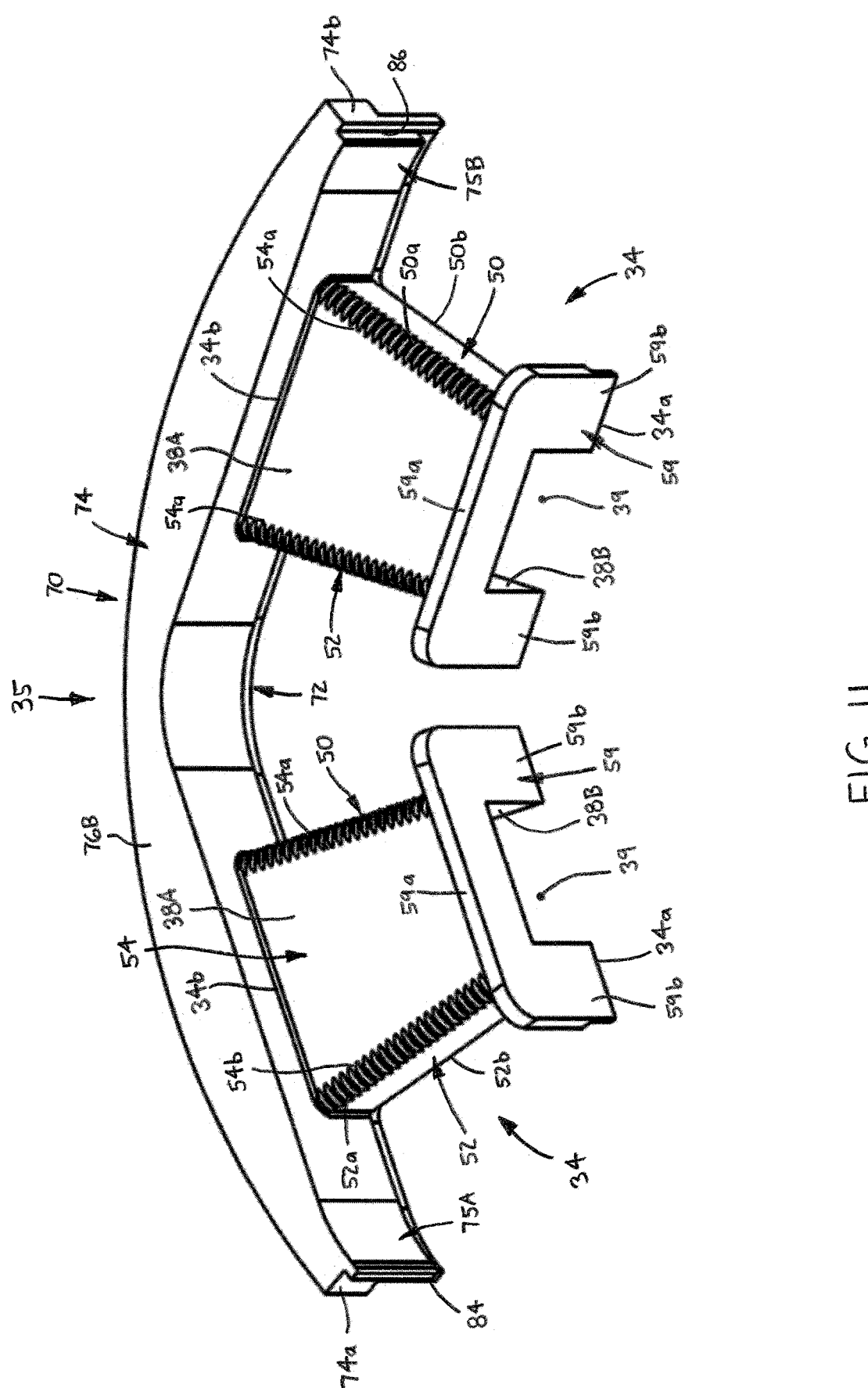
FIG. 11 is a top, inner perspective view of a preferred pair of the second housing halves.
Figure 12:
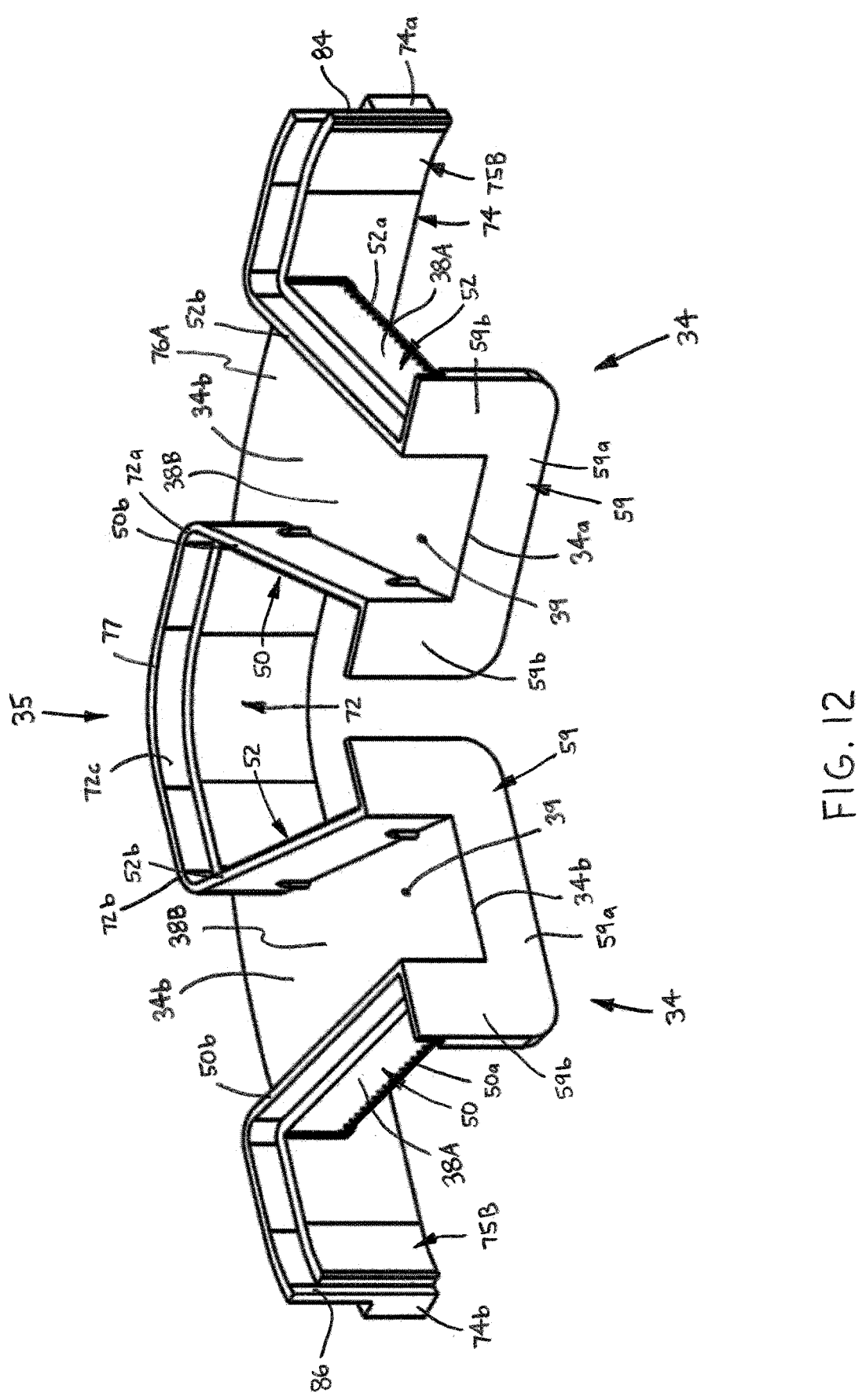
FIG. 12 is a bottom, inner perspective view of the pair of the second housing halves.

Further, each radial flange section 74 of each second skirt portion 70 is generally flat and has opposing first and second circumferential ends 74*a*, 74*b*, an inner axial surface 76A disposed against the second axial end 22*b* of the core member annular portion 22 and an opposing outer axial surface 76B. Preferably, the flange section 74 is sized having a radial dimension that is substantially less than a radial dimension of the radial flange section 64 of each first skirt portion 60, but has a substantially greater axial thickness than the radial flange section 64. As such, the base wall 54 of each second shell half 34 is preferably spaced axially inwardly from the outer axial surface 76B of the flange section 74, as best shown in FIG. 11.

Further, the circumferential section 72 of each second skirt portion 70 has an axial edge 77 configured to connect with an axial edge 61 of the first skirt portion 60 of the particular pair 15 of bobbins 14. Preferably, the circumferential section 62 of each first skirt portion 60 has an elongated stepped section 62*c* extending inwardly from a wall inner surface adjacent to the axial edge 63 and the circumferential section 72 of each second skirt portion 70 has an elongated stepped section 72*c* extending inwardly from the shell inner surface adjacent to the axial edge 77. The stepped sections 62*c*, 72*c* of the two circumferential sections 62, 72 are frictionally engaged to couple the first and second skirt portions 60, 70, such that the radial flange sections 64, 74 are retained disposed against the axial ends 22*a*, 22*b* of the core member annular portion 22.

Referring to FIGS. 1, 6, 7, 11 and 12, at least one, and preferably both, of the first skirt portion 60 and the second skirt portion 70 of each pair 15 of bobbins 14 is configured to connect with a corresponding one of the first skirt portion 60 and the second skirt portion 70 of each circumferentially adjacent pair 15 of bobbins 14. Specifically, each first skirt portion 60 has an axial recess 80 formed in the first circumferential end section 65A and the end shoulder 67A and an axial projection 82 extending circumferentially outwardly from the second circumferential end section 65B and the end shoulder 67B. Each projection 82 of the first skirt portion 60 of one pair 15 of the bobbins 14 is received in the recess 80 of the first skirt portion 60 of an adjacent pair 15 of the bobbins 14 to couple the two adjacent pairs 15 of bobbins 14. Similarly, each second skirt portion 70 has an axial projection 84 formed in the first circumferential end section 75A and the first circumferential end 74a of the flange section 74 and an axial recess 86 extending circumferentially outwardly from the second circumferential end section 75B and the second end 74b of the flange section 74. Each projection 84 of the second skirt portion 70 of one pair 15 of the bobbins 14 is received in the recess 86 of the second skirt portion 70 of an adjacent pair 15 of the bobbins 14 to further couple the two adjacent pairs 15 of bobbins 14.

Although each shell half 32 or 34 is preferably provided as a pair 33, 35 of the two shell halves 32, 34 which provide one pair 15 of the bobbins 14, each bobbin 14 may alternatively be provided as a single component including only one first shell half 32 and one second shell half 34. Furthermore, the two segments 30A, 30B of each bobbin 14 may be formed in any manner other than as a shell half. For example, the first segment 30A may be formed as a main body member with a central cavity 31 and a side-opening which enables the main body member to be installed axially on a core member projection 24 and the second segment 30B may be formed as a cover connectable with the main body member to close the side opening (structure not shown). The present invention includes all structures of the two-segment bobbin 14 described and/or depicted herein and any other appropriate structure that enables each bobbin 14 to be assembled axially onto the core member projections 24.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A stator assembly for a magnetic bearing, the stator assembly comprising:

a core member formed of a ferromagnetic material, having a centerline and including an outer annular portion and a plurality of projections extending radially inwardly from the outer annular portion and spaced circumferentially about the centerline, each projection having a first axial end and an opposing second axial end;

a plurality of bobbins, each bobbin being formed of an electrically insulative material and including a first shell half disposed against the first axial end of a separate one of the plurality of projections and a second shell half disposed against the second axial end of the one projection and coupled with the first shell half such that the one projection is enclosed within a cavity defined between the first and second shell halves; and a plurality of windings each including at least one wire wound about a separate one of the plurality of bobbins, each winding being electrically coupleable with a source of electric power such that each winding and the projection encircled by the winding provide a pole of the stator;

wherein the first shell half of each one of the plurality of bobbins is provided as a pair of first shell halves connected by a first skirt portion, the first skirt portion having a circumferential section disposable against an inner circumferential surface section of the core member annular portion extending between two adjacent core member projections and a radial flange section disposable against a first axial end of the core member annular portion; and wherein the second shell half of each one of the plurality of bobbins is provided as a pair of second shell halves connected by a second skirt portion, the second skirt portion having a circumferential section disposable against an inner circumferential surface section of the core member annular portion extending between two adjacent projections of the core member and connectable with the circumferential section of the first skirt portion and a radial flange section disposable against a second axial end of the core member annular portion, each shell half of the pair of second shell halves being connected with a separate one of the shell halves of the first pair of shell halves so as to form two bobbins.

2. The stator assembly as recited in claim 1, wherein:

the first shell half of each one of the plurality of bobbins has an inner radial end, an outer radial end and an elongated channel extending radially between the inner and outer ends such that each first shell half is installed on a separate one of the core member projections by relative axial displacement between the first shell half and the one projection in a first axial direction so that at least a portion of the one projection becomes disposed within the elongated channel of the first shell half; and the second shell half of each one of the plurality of bobbins has an inner radial end, an outer radial end and an elongated channel extending radially between the inner and outer ends such that each second shell half is installed on a separate one of the core member projections by relative axial displacement between the second shell half and the one projection in a second, opposing axial direction so that at least a portion of the one projection becomes disposed within the elongated channel of the second shell half.

3. The stator assembly as recited in claim 1, wherein:

each one of the core member projections has a first circumferential end and an opposing second circumferential end, the first and second circumferential ends extending axially between the first and second axial ends of the projection;

the first shell half of each one of the plurality of bobbins has an inner radial end, an outer radial end, a first sidewall disposed against the first circumferential end of the enclosed projection and a second sidewall disposed against the second circumferential end of the enclosed projection, the first and second sidewalls extending radially between the inner and outer radial ends; and the second shell half of each one of the plurality of bobbins has an inner radial end, an outer radial end, a first sidewall disposed against the first circumferential end of the enclosed projection and a second sidewall disposed against the second circumferential end of the enclosed projection, the first and second sidewalls extending radially between the inner and outer radial ends and each having a free end, the first sidewall of the first shell half being connected with the first sidewall of the second shell half and the second sidewall of the first shell half being connected with the second sidewall of the second shell half.

4. The stator assembly as recited in claim 3, wherein:

an elongated channel is defined between the first and second sidewalls of the first shell half of each bobbin such that each first shell half is installed on a separate one of the core member projections by relative axial displacement between the first shell half and the one projection so that at least a portion of the one projection becomes disposed within the elongated channel of the first shell half; and an elongated channel is defined between the first and second sidewalls of the second shell half of each bobbin such that each second shell half is installed on a separate one of the core member projections by relative axial displacement between the second shell half and the one projection so that at least a portion of the one projection becomes disposed within the elongated channel of the second shell half.

5. The stator assembly as recited in claim 4, wherein the first sidewall of each first shell half and the first sidewall of each second shell half are each configured to engage with a snap fit and the second sidewall of each first shell half and the second sidewall of each second shell half are each configured to engage with a snap fit.

6. The stator assembly as recited in claim 1, wherein the radial flange section of the first skirt portion includes two elongated shoulders each extending axially outwardly and circumferentially, one shoulder being located adjacent to one of the first shell halves and the other shoulder being located adjacent to an outer radial end of the other one of the first shell halves, each shoulder having at least one of a retainer notch configured to retain in tension a portion of the at least one wire extending radially outwardly from the winding disposed on the adjacent bobbin and a clearance opening for fastening cable ties for a lead wire or a winding wire.

7. The stator assembly as recited in claim 1, wherein:

each one of the core member projections has a first circumferential end and an opposing second circumferential end, the first and second circumferential ends extending axially between the first and second axial ends of the projection;

each first shell half of each one of the pairs of first shell halves has an inner radial end, an outer radial end, a first sidewall disposed against the first circumferential end of the enclosed projection and a second sidewall disposed against the second circumferential end of the enclosed projection, the first and second sidewalls extending radially between the inner and outer radial ends, the first sidewall of one of the pair of first shell halves being integrally connected with the second sidewall of the other one of the pair of first sidewalls by the circumferential section of the first skirt portion; and each second shell half of each one of the pairs of second shell halves has an inner radial end, an outer radial end, a first sidewall disposed against the first circumferential end of the enclosed projection and a second sidewall disposed against the second circumferential end of the enclosed projection, the first and second sidewalls extending radially between the inner and outer radial ends, the first sidewall of one of the pair of second shell halves being integrally connected with the second sidewall of the other one of the pair of second shell halves by the circumferential section of the second skirt portion, the first sidewall of each one of the first shell halves being connected with the first sidewall of the second shell half coupled with the one first shell half and the second sidewall of each one of the first shell halves being connected with the second sidewall of the second shell half coupled with the one first shell half.

8. The stator assembly as recited in claim 1, wherein each one of the first shell half and the second shell half of each one of the plurality of bobbins has an inner radial end, an outer radial end, an outer surface and a plurality of grooves formed in the outer surface and spaced radially apart between the inner and outer radial ends, each groove being configured to receive a portion of the at least one wire of the winding disposed about the one bobbin.

9. The stator assembly as recited in claim 8, wherein:

each one of the first shell half and the second shell half of each one of the plurality of bobbins includes a central base wall with first and second circumferential ends, a first sidewall extending axially from the first circumferential end of the central base wall and a second sidewall extending axially from the second circumferential end of the central base wall; and the plurality of grooves of each one of the plurality of bobbins includes a first set of grooves formed along an edge between the central base wall and the first sidewall and a second set of grooves formed along an edge between the central base wall and the second sidewall.

10. The stator assembly as recited in claim 1, wherein each one of the first shell half and the second shell half of each one of the plurality of bobbins has an inner radial end and a retainer flange extending axially and circumferentially from the inner radial end, each flange portion being configured to retain an inner radial end of the winding disposed about the one bobbin.

11. The stator assembly as recited in claim 1, wherein:

the first shell half of each one of the plurality of bobbins has an outer radial end and each bobbin further includes a first skirt portion extending radially outwardly from the outer radial end of the first shell half and disposed against the first axial end of the core member annular portion; and the second shell half of each one of the plurality of bobbins has an outer radial end and each bobbin further includes a second skirt portion extending radially outwardly from the outer radial end of the second shell half and disposed against the second axial end of the core member annular portion.

12. A stator assembly for a magnetic bearing, the stator assembly comprising:

a core member formed of a ferromagnetic material, having a centerline and including an outer annular portion and a plurality of projections extending radially inwardly from the outer annular portion and spaced circumferentially about the centerline, each projection having a first axial end and an opposing second axial end;

a plurality of bobbins formed of an electrically insulative material, each bobbin being provided as a pair of bobbins including a pair of first shell halves connected by a first skirt portion, each one of the first shell halves being disposed against the first axial end of a separate one of two of the plurality of projections, and a pair of second shell halves connected by a second skirt portion, each one of the second shell halves being disposed against the second axial end of a separate one of the two projections, one of the second shell halves being coupled with the one of the two first shell halves disposed against the same one of the two projections to enclose the projection within a cavity defined between the first and second shell halves and the other one of second shell halves being coupled with the one of the two first shell halves disposed against the same one of the two projections to enclose the projection within a cavity defined between the first and second shell halves; and a plurality of windings each including at least one wire wound about a separate one of the plurality of bobbins, each winding being electrically coupleable with a source of electric power, the winding disposed about one bobbin of each pair of bobbins and the projection encircled by the winding providing a north pole of the stator and the winding disposed about the other bobbin of each pair of bobbins and the projection encircled by the winding providing a south pole of the stator.

13. The stator assembly as recited in claim 12, wherein:
each one of the core member projections has a first circumferential end and an opposing second circumferential end, the first and second circumferential ends extending axially between the first and second axial ends of the projection;

each first shell half of each one of the pairs of first shell halves has an inner radial end, an outer radial end, a first sidewall disposed against the first circumferential end of the enclosed projection and a second sidewall disposed against the second circumferential end of the enclosed projection, the first and second sidewalls extending radially between the inner and outer radial ends, the first sidewall of one of the pair of first shell halves being integrally connected with the second sidewall of the other one of the pair of first shell halves by a circumferential section of the first skirt portion;

each second shell half of each one of the pairs of second shell halves has an inner radial end, an outer radial end, a first sidewall disposed against the first circumferential end of the enclosed projection and a second sidewall disposed against the second circumferential end of the enclosed projection, the first and second sidewalls extending radially between the inner and outer radial ends, the first sidewall of one of the pair of second shell halves being integrally connected with the second sidewall of the other one of the pair of second shell halves by a circumferential section of the second skirt portion, each first sidewall of each second shell half being connected with the first sidewall of each first shell half and each second sidewall of each second shell half being connected with the second of each first shell half.

14. The stator assembly as recited in claim 13, wherein:
an elongated channel is defined between the first and second sidewalls of each first shell half of each pair of first shell halves such that each pair of first shell halves is installed on a separate pair of the core member projections by relative axial displacement between the pair of first shell halves and the pair of projections in a first axial direction so
that at least a portion of one projection of the pair of projections becomes disposed within the elongated channel of a separate one of the pair of first shell halves; and an elongated channel is defined between the first and second sidewalls of each second shell half of each pair of second shell halves such that each pair of second shell halves is installed on a separate pair of the core member projections by relative axial displacement between the pair of second shell halves and the pair of projections in a second, opposing axial direction so that at least a portion of one projection of the pair of projections becomes disposed within the elongated channel of a separate one of the pair of second shell halves.

15. The stator assembly as recited in claim 13, wherein the first sidewall of each first shell half of the first pair of shell halves and the first sidewall of each second shell half of the pair of second shell halves are each configured to engage with a snap fit and the second sidewall of each first shell half of the pair of first shell halves and the second sidewall of each second shell of the second pair of shell halves are each configured to engage with a snap fit.

16. The stator assembly as recited in claim 12, wherein:
each first skirt portion has a circumferential section disposable against an inner circumferential surface section of the core member annular portion extending between two adjacent core member projections and a radial flange section disposable against a first axial end of the core member annular portion; and each second skirt portion has a circumferential section disposable against the inner circumferential surface section of the core member annular portion extending between the two adjacent projections of the core member and connected with the circumferential section of the first skirt portion and a radial flange section disposable against a second axial end of the core member annular portion.

17. The stator assembly as recited in claim 12 wherein at least one of the first skirt portion and the second skirt portion of each pair of bobbins is configured to connect with a corresponding one of the first skirt portion and the second skirt portion of each circumferentially adjacent pair of bobbins.

18. A stator assembly for a magnetic bearing, the stator assembly comprising:
a core member formed of a ferromagnetic material, having a centerline and including an outer annular portion and a plurality of projections extending radially inwardly from the outer annular portion and spaced circumferentially about the centerline;

a plurality of bobbins, each bobbin being formed of an electrically insulative material and including a first segment with a first open cavity disposed against a separate one of the plurality of projections such that a portion of the one projection is disposed within the first open cavity and a second segment with a second open cavity disposed against the one projection such that a remaining portion of the one projection is disposed within the second open cavity, the second segment being coupled with the first segment such that the one projection is enclosed within the bobbin first and second segments; and a plurality of windings each including at least one wire wound about a separate one of the plurality of bobbins, each winding being electrically coupleable with a source of electric power such that each winding and the projection encircled by the winding provide a pole of the stator;

wherein the first segment of each one of the plurality of bobbins is provided as a pair of first segments connected by a first skirt portion, the first skirt portion having a circumferential section disposable against an inner circumferential surface section of the core member annular portion extending between two adjacent core member projections and a radial flange section disposable against a first axial end of the core member annular portion; and wherein the second segment of each one of the plurality of bobbins is provided as a pair of second segments connected by a second skirt portion, the second skirt portion having a circumferential section disposable against an inner circumferential surface section of the core member annular portion extending between two adjacent projections of the core member and connectable with the circumferential section of the first skirt portion and a radial flange section disposable against a second axial end of the core member annular portion, each segment of the pair of second segments being connected with a separate one of the segments of the first pair of segments so as to form two bobbins.

\*    \*    \*    \*    \*